United States Patent [19]
Greywall

[11] Patent Number: 5,684,631
[45] Date of Patent: Nov. 4, 1997

[54] OPTICAL MODULATOR/SWITCH INCLUDING REFLECTIVE ZONE PLATE AND RELATED METHOD OF USE

[75] Inventor: Dennis S. Greywall, White House Station, N.J.

[73] Assignee: Lucent Technologies Inc., Murray Hill, N.J.

[21] Appl. No.: 645,109

[22] Filed: May 13, 1996

[51] Int. Cl.$^6$ .................. G02B 27/44; G02B 5/18; G02B 5/32; G02B 6/26
[52] U.S. Cl. ............... 359/565; 359/572; 359/19; 385/18
[58] Field of Search ................ 359/565, 572, 359/569, 15, 19, 128, 157, 173; 385/15, 16, 18, 33, 34

[56] References Cited

U.S. PATENT DOCUMENTS

| | | | |
|---|---|---|---|
| 3,886,544 | 5/1975 | Narodny | 385/18 |
| 3,953,105 | 4/1976 | Ih | 359/565 |
| 4,329,017 | 5/1982 | Kapany et al. | 385/22 |
| 4,626,066 | 12/1986 | Levinson | 385/18 |
| 4,662,746 | 5/1987 | Hornbeck | 359/223 |
| 4,907,851 | 3/1990 | Marhic | 359/15 |
| 5,161,059 | 11/1992 | Swanson et al. | 359/565 |
| 5,325,176 | 6/1994 | Suda et al. | 356/400 |
| 5,361,315 | 11/1994 | Lewis et al. | 385/18 |
| 5,543,956 | 8/1996 | Nakagawa et al. | 359/225 |

FOREIGN PATENT DOCUMENTS

| 2558970 | 8/1985 | France | 385/18 |
|---|---|---|---|

*Primary Examiner*—Jon W. Henry

[57] ABSTRACT

An optical modulator/optical switch is disclosed. The modulator/switch includes a reflective zone plate defined in a movable zone plate support. The reflective zone plate focuses an optical signal reflected therefrom. In response to a control signal, a controlled voltage source applies a voltage across the movable zone plate support and a layer spaced from the zone plate support. The applied voltage generates an electrostatic force that causes the zone plate support to move towards the other layer. When the zone plate support moves, the reflective zone plate's orientation to an optical signal incident thereon changes. Such a change in orientation alters the path of the optical signal reflected from the reflective zone plate. The reflected optical signal can be directed to different receiving waveguides by changing the amplitude of the applied voltage.

19 Claims, 12 Drawing Sheets

OPTICAL MODULATOR/SWITCH INCLUDING REFLECTIVE ZONE PLATE AND RELATED METHOD OF USE

FIELD OF THE INVENTION

The present invention relates to optical modulators and switches. More particularly, the present invention relates to micromachined devices employing a focusing device for modulating an optical signal or for functioning as an optical switch.

BACKGROUND OF THE INVENTION

There is increasing interest in developing inexpensive optical modulators and switches. A number of structures for optical modulators have been proposed. Most utilize a variable air gap defined by two layers of material, at least one of which layers is movable. Varying the air gap by moving one of the layers changes an optical property of the device, typically the reflectivity. Thus, in one state, the modulator is highly reflective to an incident optical signal, and in another state, the modulator has a very low reflectivity to the incident optical signal. This difference in reflectivity is used to modulate the optical signal. Such modulators are usually activated by applying a voltage across the two layers generating an electrostatic force that causes the movable layer to move towards the other layer.

There are a number of drawbacks associated with modulators having the aforementioned structure. For example, a particular value of the voltage, e.g., 37.4 volts, may be required for moving the movable layer a specified distance to achieve a maximum change in optical properties between the "voltage-off" and the "voltage-off" state. As the modulator ages, the particular value may change. To the extent the drive voltage is not suitably adjusted, modulator performance is degraded. Furthermore, the underlying optical principles of the device may place constraints on the thickness or other characteristics of the layers. Such constraints limit materials selection and complicate fabrication. Also, such modulators are typically used with only a single optical fiber, limiting the potential usefulness of these devices.

Thus, there is a need for an optical modulator that avoids these drawbacks of the prior art.

SUMMARY OF THE INVENTION

An optical modulator/switch is disclosed. The optical modulator/switch includes a reflective zone plate for reflecting an incident optical signal. The optical modulator/switch further includes a means for rotating or tilting the reflective zone plate from an initial orientation, typically normal to an incident optical signal, to at least one other orientation.

The reflective zone plate functions as a lens, receiving an incoming optical signal and focusing a reflected signal. The zone plate alters the phase of, or removes, contributions to the optical signal which result in destructive interference upon reflection. The resulting reflected optical signal has a much higher central intensity than if the signal was reflected from a mirror or other reflective surface.

By tilting the reflective zone plate away from its initial orientation, the direction of the reflected optical signal can be altered. In one embodiment of a modulator/switch according to the present invention, the reflective zone plate is rapidly tilted between its initial orientation when the modulator/switch is in a quiescent state, and a second orientation ("the biased state of the modulator/switch") in response to a voltage signal from a controlled voltage source. In the quiescent state, the reflected signal is in optical communication with a wave guide; in the biased state, the path of the reflected signal is altered so that the optical signal is no longer in optical communication with the wave guide. In this manner, an optical signal can be modulated with very high contrast between the quiescent and biased states. Moreover, a modulator/switch according to the present invention does not have to be operated at a specific voltage to achieve maximum contrast between the two states. Rather, as long the voltage is sufficient to tilt the reflective zone plate enough to ensure that, in the biased state, the optical signal is not captured by the wave guide, maximum contrast is achieved. Furthermore, since, in preferred embodiments, the optical signal is reflecting from a high reflectivity coating, there are relatively few limitations regarding suitable support materials for the reflective zone plate.

In other embodiments, the reflective zone plate can be tilted to a plurality of orientations, each of which orientations result in different optical paths for a reflected optical signal. In each orientation, the reflective zone plate is in optical communication with a different wave guide. Thus, in response to a voltage signal from a controlled voltage source, an incident optical signal can be switched to any one of a plurality of wave guides.

BRIEF DESCRIPTION OF THE DRAWINGS

Further features of the invention will become more apparent from the following detailed description of specific embodiments thereof when read in conjunction with the accompanying drawings in which:

FIG. 1b is a side-view of the modulator/switch of FIG. 1a;

DETAILED DESCRIPTION OF THE INVENTION

Figure 1A:
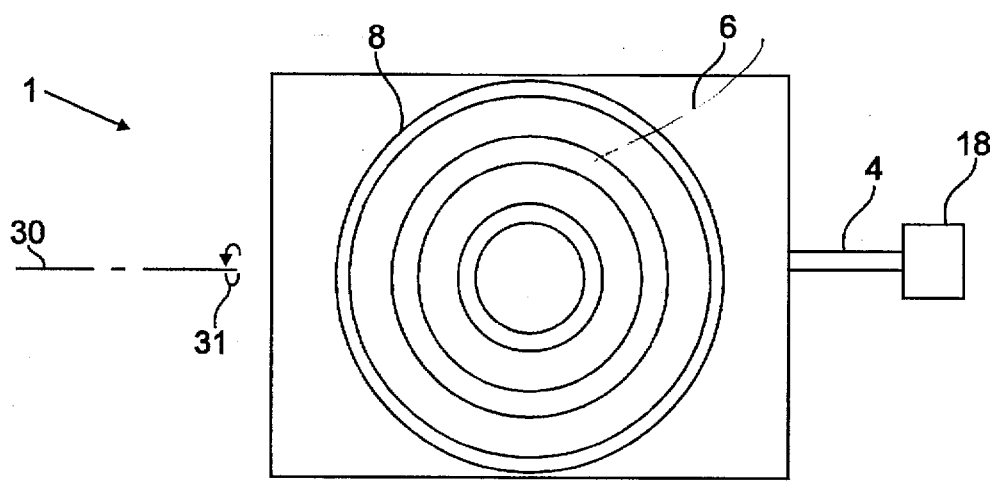
FIG. 1a is a plan view of a conceptual schematic of an optical modulator/switch according to the present invention.
Figure 1B:
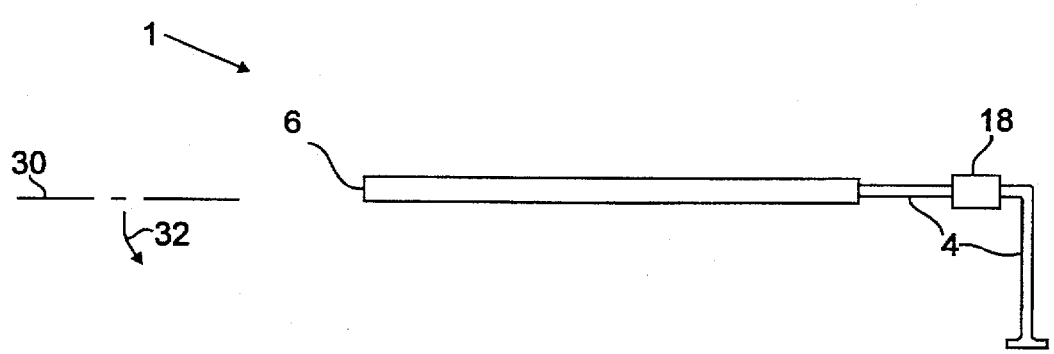

FIGS. 1a and 1b are simplified schematic diagrams, plan view and side view, respectively, of an optical modulator/switch 1 according to the present invention. The optical modulator/switch 1 includes a reflective zone plate 8 defined in or on a zone-plate support 6. The zone-plate support is mechanically connected to a support means 4. The optical modulator/switch 1 further includes a movement means 18 for rotating or tilting the reflective zone plate 8 away from an axis 30. Depending upon the specific embodiment of the modulator/switch 1, several of which are described later in this specification, the reflective zone plate 8 can be rotated in the direction 31 about the axis 30 or in the direction 32 away from the axis 30. Further description of the support means 4 and the movement means 18 are presented later in this specification in conjunction with several preferred embodiments of the optical modulator/switch.

The reflective zone plate 8 behaves in a manner quite similar to a lens, focusing an incident optical signal. It accomplishes this result as follows. In the absence of the reflective zone plate 8, the amplitude of light reflected from a mirror decreases with total distance from the mirror due to the diverging light beam. If the mirror is divided into a series of concentric rings or zones, the amplitude of the reflected light is simply the sum of the contributions from each of the zones. Since the light from each zone travels a slightly different overall distance, each contribution arrives at a detection point with a different phase. This leads to interference effects. By removing those zones that lead to destructive interference, the reflective zone plate can be used to greatly enhance the total amplitude at a given distance from the plate, i.e., at a "focal point." In one embodiment, the destructive contributions are removed by constructing a series of properly spaced non-reflecting rings, such as illustrated in FIG. 2.

Figure 2:
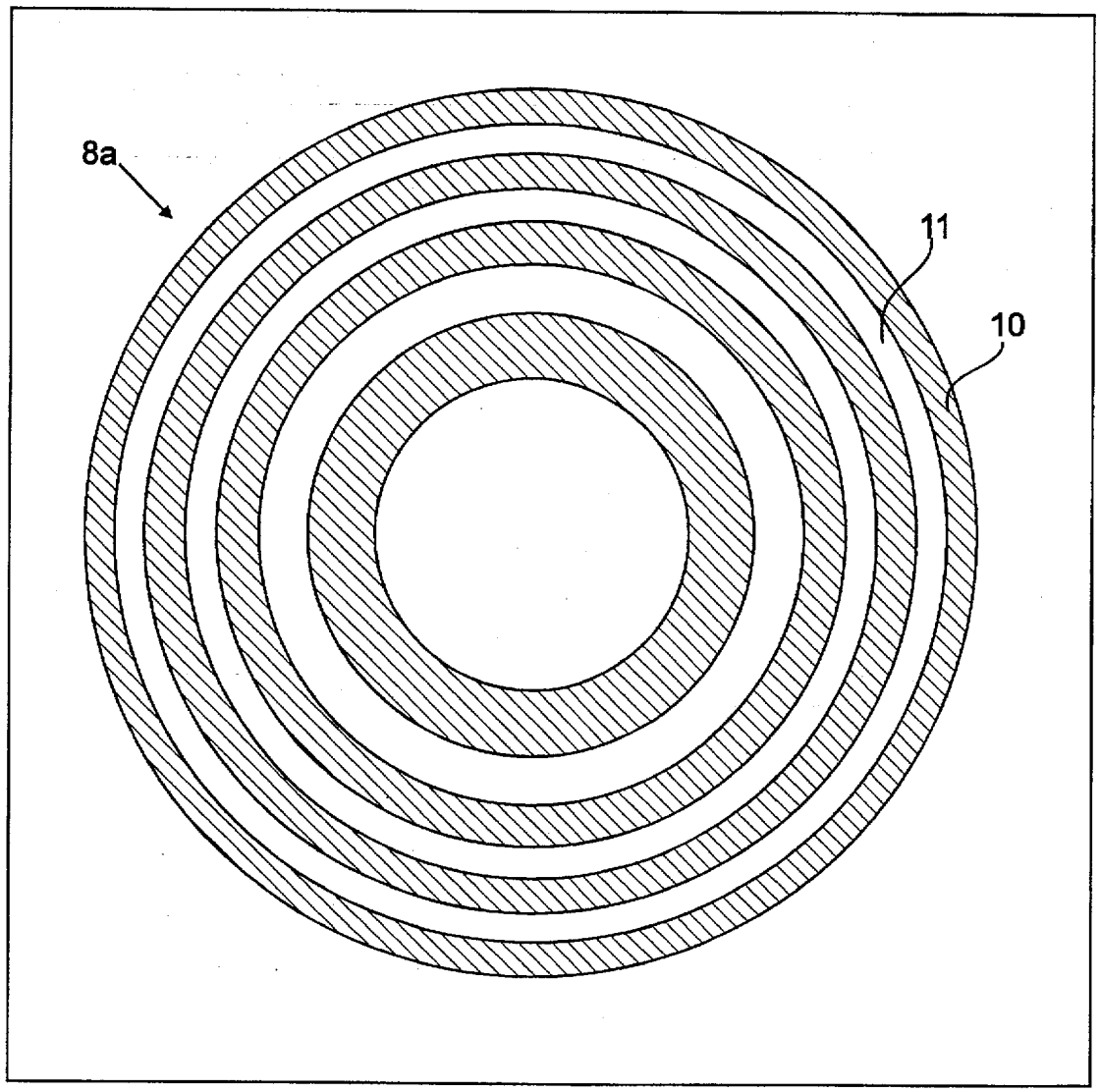
FIG. 2 is an exemplary embodiment of a reflective zone plate.

The reflective zone plate 8a shown in FIG. 2 is defined by four spaced, concentrically-disposed, circularly-shaped non-reflective regions 10. Reflective regions 11 are located between the non-reflective regions 10. The reflective regions 11 are located to achieve a net constructive interference at the location of the detector.

It should be understood that the configuration of a reflective zone plate 8 for use in the present invention will vary with the wavelength of the optical signal being reflected, the distance of the reflective zone plate from a wave guide that delivers the optical signal, and the distance between the reflective zone plate and a waveguide, detector or the like that receives the reflected optical signal. Thus, in other embodiments, a reflective zone plate may include more or less than four non-reflective regions 10 as a function of the aforementioned factors. Other embodiments of reflective zone plates, and methods for calculating the required number, m, of regions or zones and the radius, $R_i$, of the regions 10, are described later in this specification.

Moreover, it will be appreciated that in an alternate embodiment, a reflective zone plate can be formed as shown in FIG. 2, except that the non-reflective regions 10 of the alternate embodiment are placed where the reflective regions 11 of the plate of FIG. 2 are located. The reflected amplitude from the two embodiments are similar, except for a phase difference of 180°. The phase is not important in terms of modulator/switch performance. The operation of an optical modulator/switch 1 according to the present invention is described below.

Figure 3:
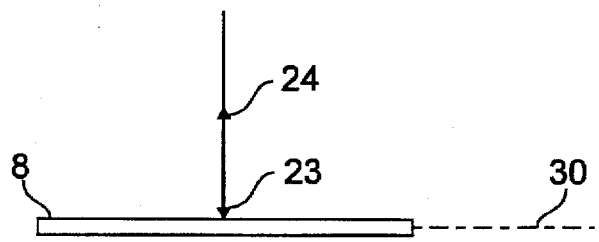
FIG. 3 is a partial view of a modulator/switch according to the present invention wherein the reflective zone plate is coincident with an axis perpendicular to an incident optical signal.
Figure 4:
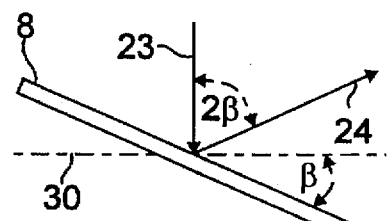
FIG. 4 shows the modulator/switch of FIG. 3 wherein the reflective zone plate is tilted relative to the axis.

In FIG. 3, the reflective zone plate 8 is aligned with the axis 30 and is normal to an incident optical signal 23. Thus, a signal 24 reflected from the reflective zone plate 8 will be directed back along the same path as the incident optical signal 23 but in the opposite direction. In FIG. 4, the reflective zone plate 8 is tilted from the axis 30 by an angle, β, so that the incident optical signal 23 is no longer normal to the reflective zone plate 8. As such, the optical signal 24 will be reflected from the reflective zone plate 8 such that the angle described by the incident signal and the reflected signal is 2β. As described below, by rapidly tilting the reflective zone plate 8 between those two orientations in response to a control signal, the reflective zone plate can be used to modulate an optical signal or function as an optical switch. FIGS. 5a–5g illustrate using the optical modulator/switch 1 with various wave guiding arrangements.

Figure 5A:
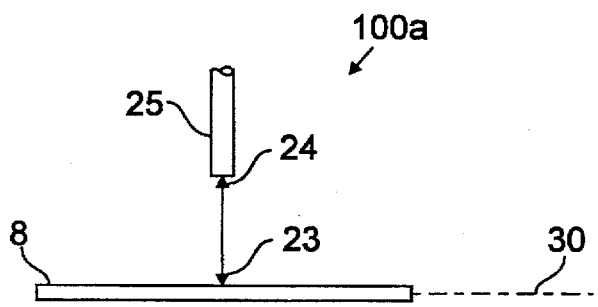
FIG. 5a shows an arrangement wherein a modulator/switch according to the present invention is being used in conjunction with one wave guide to modulate an optical signal, wherein the reflective zone plate of the modulator/switch is coincident with an axis perpendicular to the incident optical signal.
Figure 5B:
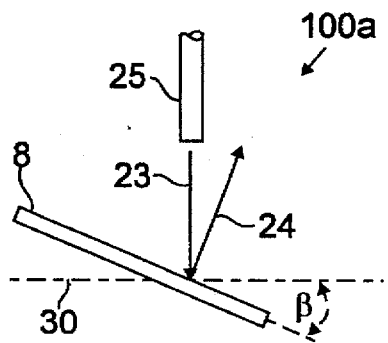
FIG. 5b shows the arrangement of FIG. 5a wherein the reflective zone plate is tilted relative to the axis.

FIGS. 5a and 5b illustrate an arrangement 100a wherein the optical modulator/switch 1 is used as an optical modulator. The arrangement 100a comprises the optical modulator/switch 1 and a wave guide 25 used for carrying both an incident optical signal and a reflected optical signal. As used herein, the term "wave guide" refers to optical fibers or any other medium suitable for supporting the propagation of an optical signal. FIGS. 5a and 5b show the reflective zone plate 8 spaced from the wave guide 25. The axis 30 is perpendicular to the waveguide 25.

In FIG. 5a, the optical modulator/switch 1 is shown in its "untilted" or "quiescent" state wherein the reflective zone plate 8 is aligned along the axis 30. In the quiescent state, the reflective zone plate 8 is perpendicular to the wave guide 25. In this state, the reflective zone plate 8 receives an incident optical signal 23 and delivers a reflected optical signal 24 back to the wave guide 25. In FIG. 5b, the optical modulator/switch 1 is shown in the "tilted" or "biased" state wherein the reflective zone plate 8 is tilted by the angle, $\beta$, from the axis 30. In the biased state, the reflective zone plate 8 is not perpendicular to the wave guide 25. Thus, in the biased state, the optical signal 24 reflected from the reflective zone plate 8 follows a path that is displaced by an angle, $2\beta$, from the incident optical signal 23 and will not be received by the wave guide 25.

Figure 5C:
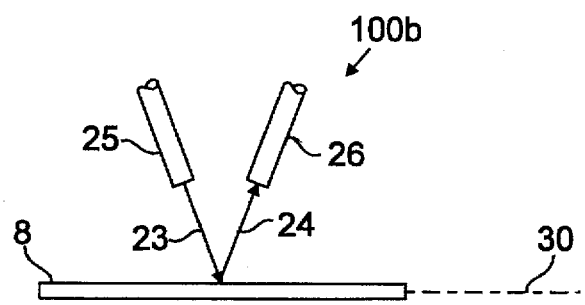
FIG. 5c shows an arrangement wherein a modulator/switch according to the present invention is being used in conjunction with two wave guides to modulate an optical signal, the modulator/switch being shown in the quiescent state.
Figure 5D:
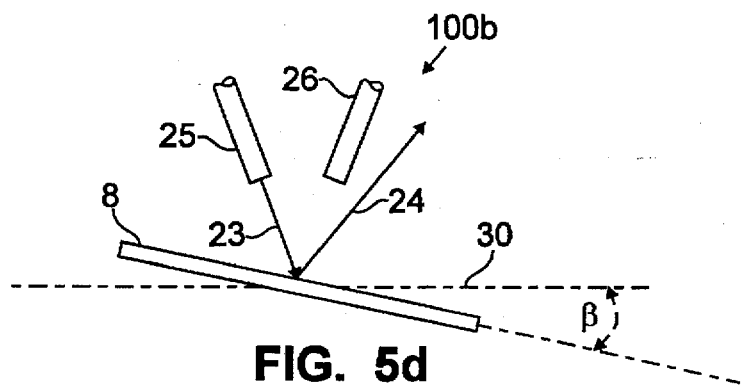
FIG. 5d shows the arrangement of FIG. 5c in the biased state.

FIGS. 5c and 5d illustrates a second arrangement 100b wherein the optical modulator/switch 1 is used, once again, as an optical modulator. The arrangement 100b comprises the optical modulator/switch 1 and two wave guides 25 and 26. In the arrangement 100b, one of the waveguides, such as the wave guide 25, delivers the incident optical signal 23 to the reflective zone plate 8 and the other wave guide 26 receives the reflected optical signal 24. FIGS. 5c and 5d show the reflective zone plate 8 spaced from the wave guides 25 and 26. The wave guides 25 and 26 are positioned so that when the optical modulator/switch is in the quiescent state, shown in FIG. 5c, the reflected optical signal 24 is directed along a first path to the wave guide 26. In the biased state, shown in FIG. 5d, the reflected optical signal 24 is deflected by an angle, $2\beta$, from the first path. So deflected, the optical signal 24 is not received by the wave guide 26.

Figure 5E:
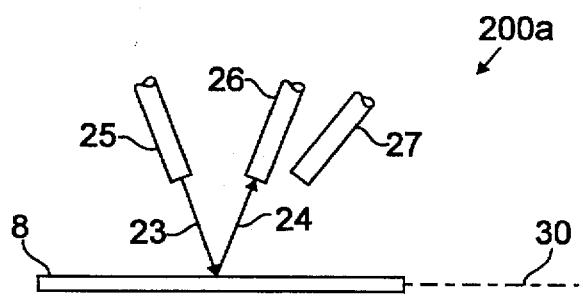
FIG. 5e shows an arrangement wherein a modulator/switch according to the present invention is being used in conjunction with three wave guides to function as a switch, wherein the modulator/switch is shown in the quiescent state.
Figure 5F:
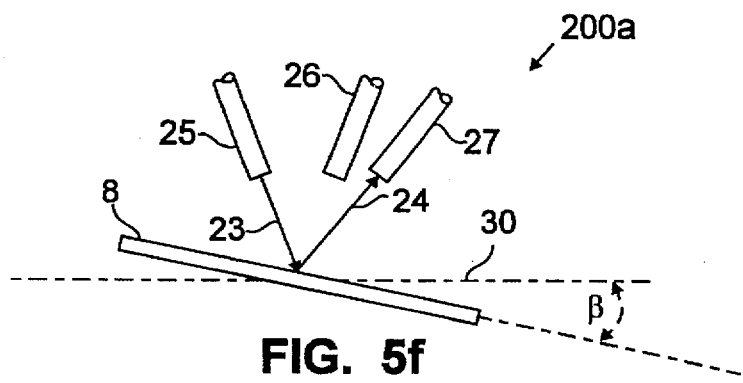
FIG. 5f shows the arrangement of FIG. 5e wherein the modulator/switch is shown in the biased state.

FIGS. 5e and 5f illustrate an arrangement 200a wherein the optical modulator/switch 1 is used as an optical switch. The arrangement 200a comprises the optical modulator/switch 1 and three wave guides 25, 26 and 27. FIGS. 5e and 5f show the reflective zone plate 8 spaced from the three wave guides. The wave guide 25 delivers an optical signal 23 to the reflective zone plate 8 and one of the wave guides 26 or 27 receives the reflected optical signal 24. The wave guides 25 and 26 are positioned so that when the optical modulator/switch 1 is in the quiescent state, shown in FIG. 5e, the reflected optical signal 24 is directed along a first path to the wave guide 26. In the biased state, shown in FIG. 5d, the reflected optical signal 24 is deflected by an angle, $2\beta$, from the first path. So deflected, the optical signal 24 follows a second path to be received by the wave guide 27.

Figure 5G:
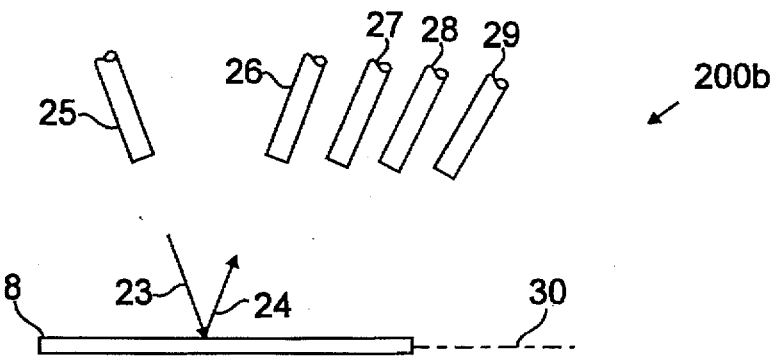
FIG. 5g shows an arrangement wherein a modulator/switch according to the present invention is being used in conjunction with five wave guides to function as a switch.

It will be appreciated that in other embodiments, such as, for example, an embodiment shown in FIG. 5g, further wave guides can be used for receiving the reflected optical signal 24. FIG. 5g shows an arrangement 200a comprising the optical modulator/switch 1, a wave guide 25 for delivering an optical signal 23 and four wave guides, 26–29, for receiving the reflected optical signal 24. By varying the tilt angle, $\beta$, of the reflective zone plate 8 relative to the axis 30, the optical path of the reflected signal 24 can be varied. Thus, by causing the reflective zone plate 8 to appropriately tilt, the reflected optical signal 24 can be directed to any one of the four waveguides 26–29.

Guidelines concerning the spacing between the reflective zone plate 8 and the wave guides for arrangements such as those described above will be provided later in this specification.

Having described the general features of the optical modulator/switch 1, its operation and exemplary uses, three specific embodiments of an optical modulator/switch according to the present invention, and methods for making them, will be described below. While some elements of one embodiment may be structurally identical to elements in other embodiments, all elements pertaining to a particular embodiment, with the exception of the reflective zone plate 8, will be designated by an alphabetic character distinguishing them from the elements of other embodiments, e.g., all elements of modulator/switch 1a will be designated by an identifier "a", as well as by a reference numeral, while those of the modulator 1b will be designated by an identifier "b".

Figure 6A:
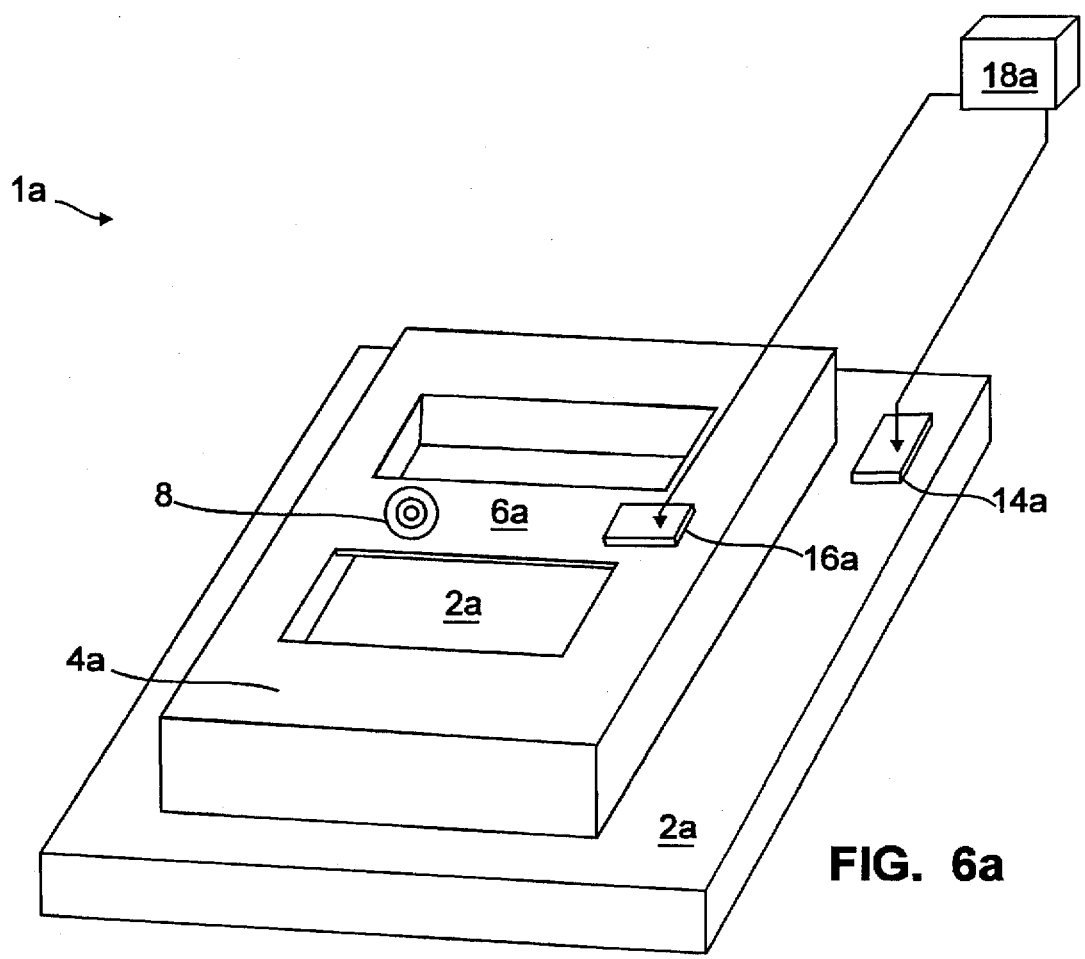
FIG. 6a is a perspective view of a first preferred embodiment of an optical modulator/switch according to the present invention wherein the zone-plate support is configured as a doubly-supported beam.

FIG. 6a shows, in a perspective view, a preferred embodiment of a micromechanical optical modulator/switch 1a according to the present invention. The optical modulator/switch 1a includes a reflective zone plate 8 defined off-center in a flexible conductive zone-plate support 6a. The zone-plate support 6a is suspended above a conductive layer 2a by support structure 4a. In a preferred embodiment, contacts 14a and 16a are disposed on the conductive layer 2a and the zone-plate support 6a, respectively. The contacts 14a and 16a facilitate electrical connection to a controlled voltage source 18a. The zone-plate support 6a is referred to herein as a doubly-supported beam structure or configuration.

Figure 6B:
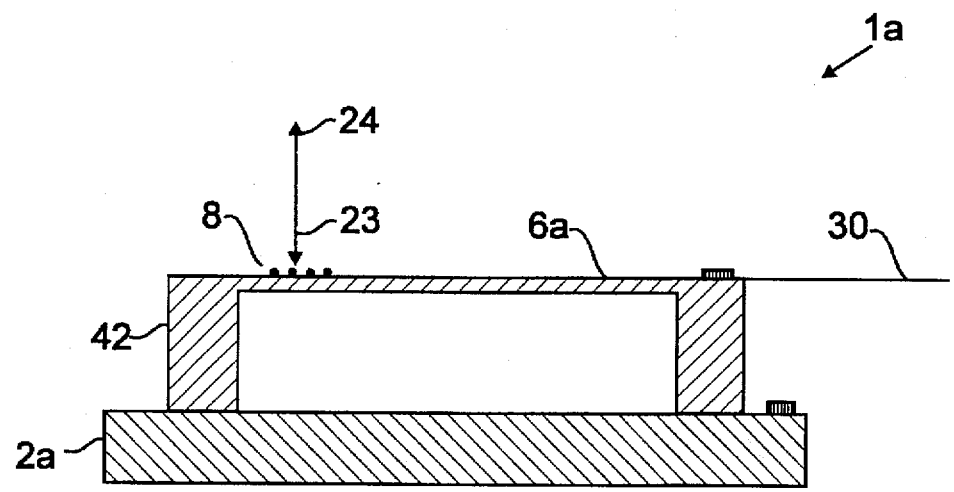
FIG. 6b shows the optical modulator/switch of FIG. 6a in the quiescent state.

Regarding operation, FIGS. 6a and 6b show the optical modulator/switch 1a in a quiescent state, wherein the reflective zone plate 8 is perpendicular to an incident optical signal 23. The reflected optical signal 24 will return along the same path as the incident optical signal 23 but in the opposite direction.

Figure 6C:
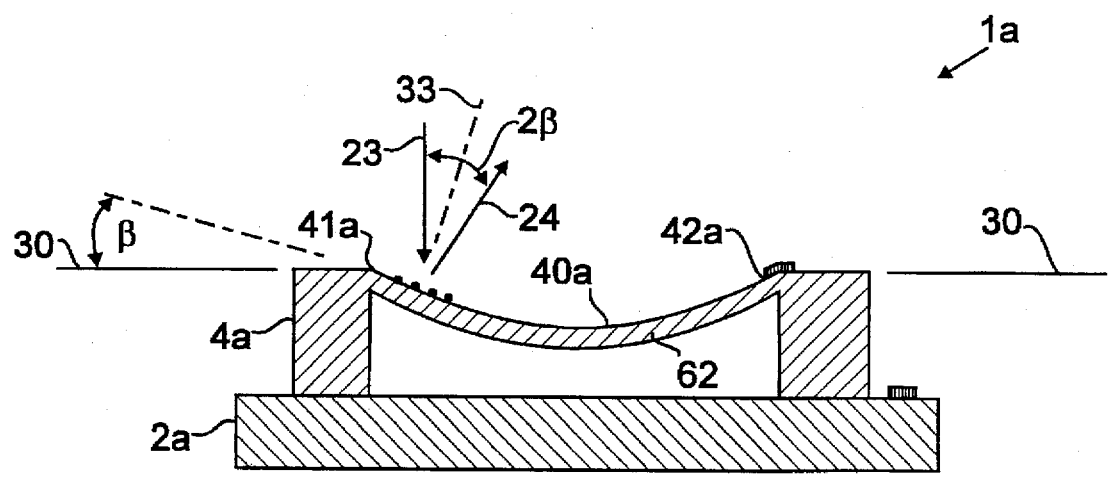
FIG. 6c shows the optical modulator/switch of FIG. 6a in the biased state.

FIG. 6c shows a cross-sectional view of the optical modulator/switch 1a in a biased state. In response to a control signal, the controlled-voltage source 18a applies a voltage across the zone-plate support 6a and conductive layer 2a. The applied voltage generates an electrostatic force that causes the zone-plate support 6a to move towards the conductive layer 2a. In the optical modulator/switch 1a, each end 41a, 42a of the zone-plate support 6a is attached to the support structure 4a. Thus, when the optical modulator/switch 1a is under bias, regions nearer the center 40a of the zone-plate support 6a deflect more, relative to the axis 30, than regions near the ends 41a, 42a of the zone-plate support 6a. Since the reflective zone plate 8 is located off-center on the zone-plate support 6a, it will tilt downwardly toward the center 40a of the zone-plate support 6a. The reflective zone plate 8 will thus be displaced by an angle, $\beta$, relative to the axis 30, from its non-biased orientation. As such, an axis 33 normal to the reflective zone plate 8a will no longer be coincident with the incident optical signal 23. The reflected optical signal 24 will therefore not return to its source. The path of the reflected optical signal 24 will be displaced from the path of the incident optical signal 23 by $2\beta$.

In the optical modulator/switch 1a, the zone-plate support 6a and the support structure 4a provide the function and structure indicated by the support means 4 of the optical modulator/switch 1 described earlier in this specification. The controlled-voltage source 18a in conjunction with the conductivity of the zone-plate support 6a and the conductive layer 2a, as well as the flexibility of the zone-plate support 6a provide the function and structure indicated by the movement means 18 of the modulator/switch 1.

Figure 7A:
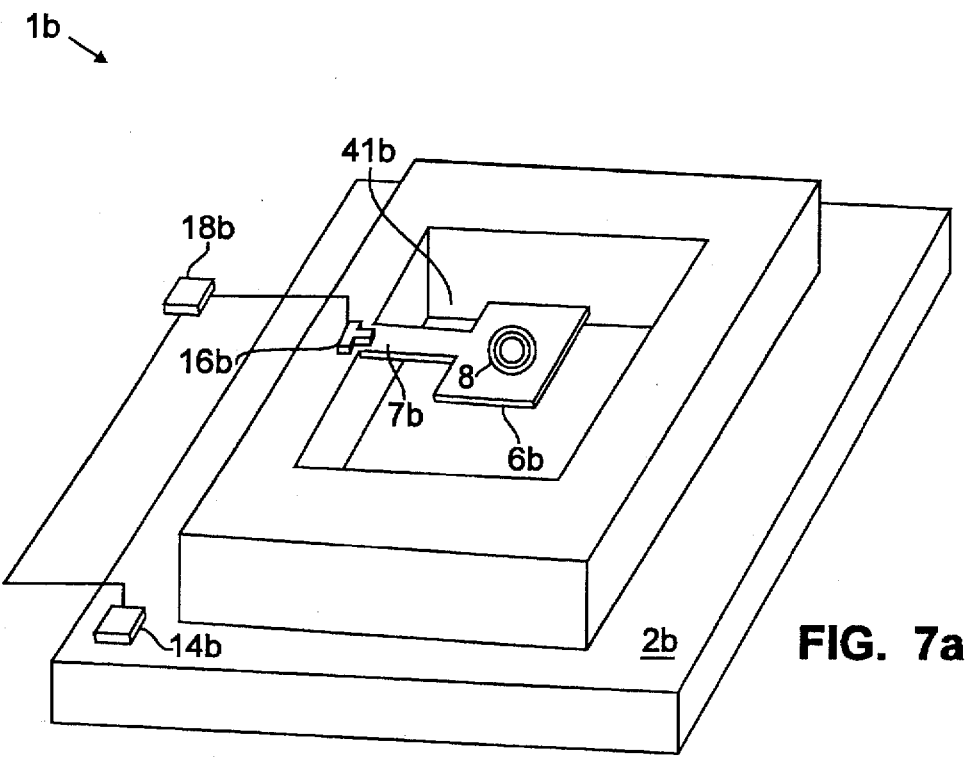
FIG. 7a is a perspective view of a second preferred embodiment of an optical modulator/switch according to the present invention wherein the zone-plate support is configured as a cantilevered structure.

FIG. 7a shows, in a perspective view, a second preferred embodiment of a micromechanical optical modulator/switch 1b according to the present invention. The optical modulator/switch 1b includes a reflective zone plate 8 defined in a conductive zone-plate support 6b. A flexible member 7b depending from a side 41b of the zone-plate support 6b is attached to a support structure 4b. The support structure 4b, in conjunction with the flexible member 7b, suspend the zone-plate support 6b above a conductive layer 2b. In a preferred embodiment, contacts 14b and 16c are disposed so that they are in electrical contact with the conductive layer 2b and the zone-plate support 6b, respectively. The contacts 14b and 16b facilitate electrical connection to a controlled voltage source 18b. The zone-plate support 6b in conjunction with the flexible member 7b are referred to herein as a cantilever structure or configuration.

Figure 7B:
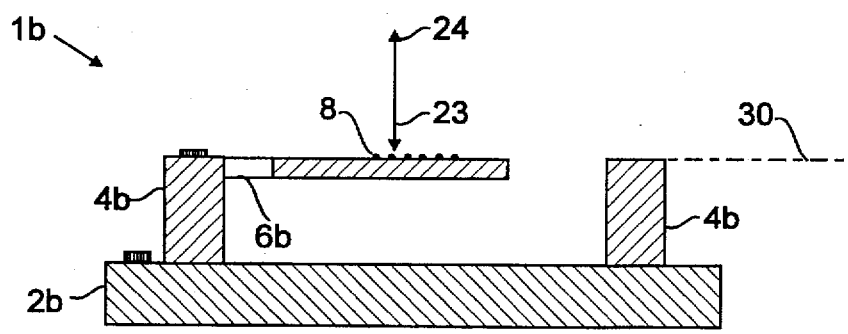
FIG. 7b shows the optical modulator/switch of FIG. 7a in the quiescent state.

Regarding operation, FIGS. 7a and 7b show the optical modulator/switch 1b in a quiescent state, wherein the reflective zone plate 8 is perpendicular to an incident optical signal 23. The reflected optical signal 24 will return along the same path as the incident optical signal 23 but in the opposite direction.

Figure 7C:
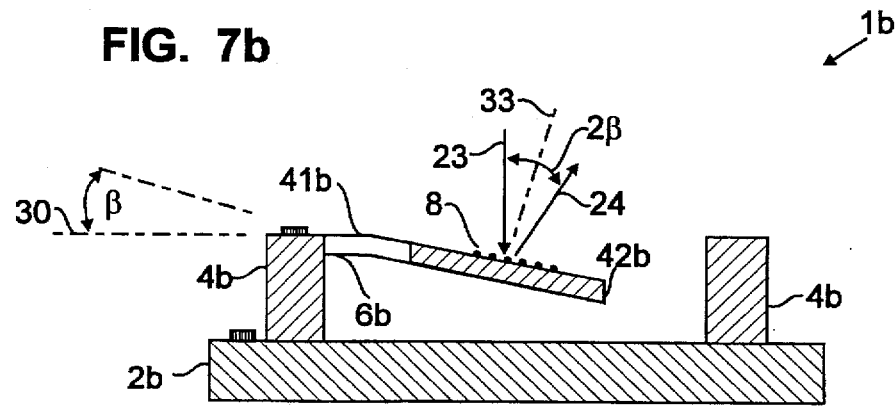
FIG. 7c shows the optical modulator/switch of FIG. 7a in the biased state.

FIG. 7c shows a cross-sectional view of the optical modulator/switch 1a in a biased state. In response to a control signal, the controlled-voltage source 18b applies a voltage across the zone-plate support 6b and conductive layer 2b. The resulting electrostatic force causes the zone-plate support 6b to move towards the conductive layer 2b. In the cantilever configuration of the optical modulator/switch 1b, the end 41b of the zone-plate support 6b remains nearest the axis 30 while the end 42b of the zone-plate support deflects furthest from the axis 30. Thus, when the optical modulator/switch 1b is under bias, the reflective zone plate 8 tilts downwardly toward the end 42b. The reflective zone plate 8 will be thus be displaced by an angle, β, relative to the axis 30, from its non-biased orientation. As such, normal axis 33 will no longer be coincident with the incident optical signal 23. The reflected optical signal 24 will therefore not return to its source; its path will be displaced from the path of the incident optical signal 23 by 2β.

In the modulator/switch 1b, the zone-plate support 6b, flexible member 7b and the support structure 4b provide the function and structure indicated by the support means 4 of the optical modulator/switch 1 described earlier. The controlled-voltage source 18b and flexible member 7b, in conjunction with the conductivity of the zone-plate support 6b and the conductive layer 2b, provide the function and structure indicated by the movement means 18 of the modulator/switch 1.

Figure 8A:
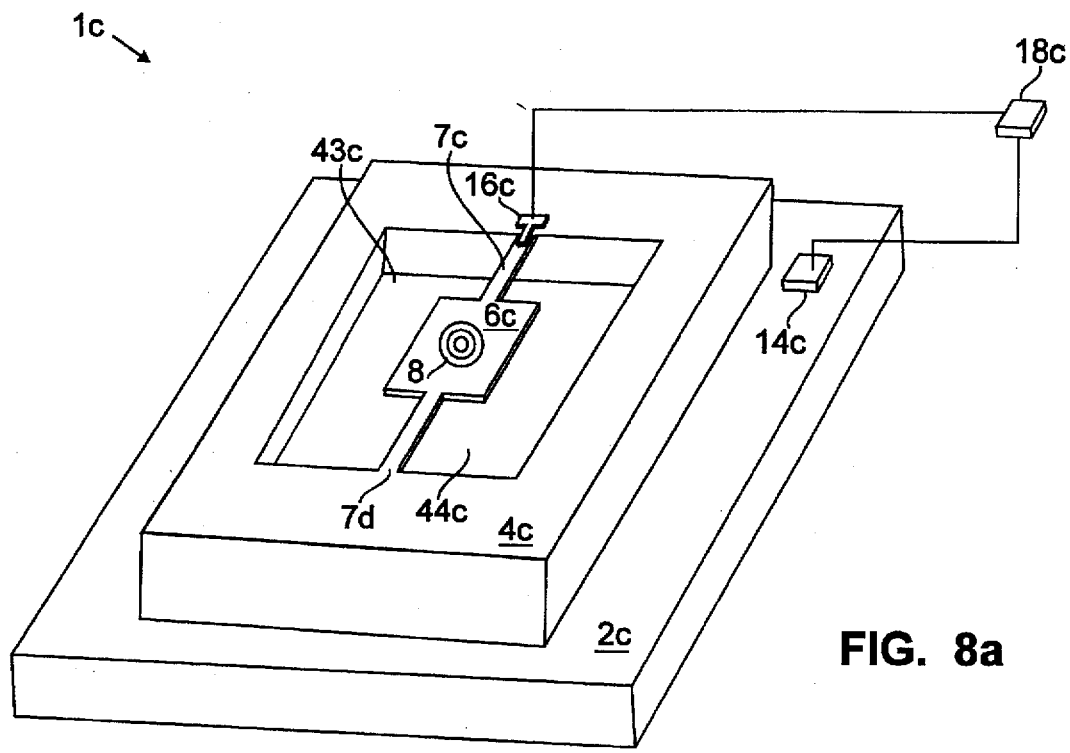
FIG. 8a is a perspective view of a second preferred embodiment of an optical modulator/switch according to the present invention wherein the zone-plate support is configured as a torsional structure.

FIG. 8a shows a third preferred embodiment of an optical modulator/switch 1c. The optical modulator/switch 1c includes a reflective zone plate 8 defined in an at least partially conductive zone-plate support 6c. Torsional members 7c and 7d, depending from sides 43c and 44c, respectively, of the zone-plate support 6c are attached to a support structure 4c. The support structure 4c, in conjunction with the torsional members 7c and 7d, suspend the zone-plate support 6c above an at least partially conductive layer 2c. In a preferred embodiment, contacts 14c and 16c are disposed so that they are in electrical contact with the conductive layer 2c and the zone-plate support 6c, respectively. The contacts 14c and 16c facilitate electrical connection to a controlled voltage source 18c. Using the torsional members 7c and 7d as a dividing line, only about one half of either the layer 2c or the zone-plate support 6c should be conductive. The zone-plate support 6c in conjunction with the torsional members 7c and 7d are referred to herein as a torsional structure or configuration.

Figure 8B:
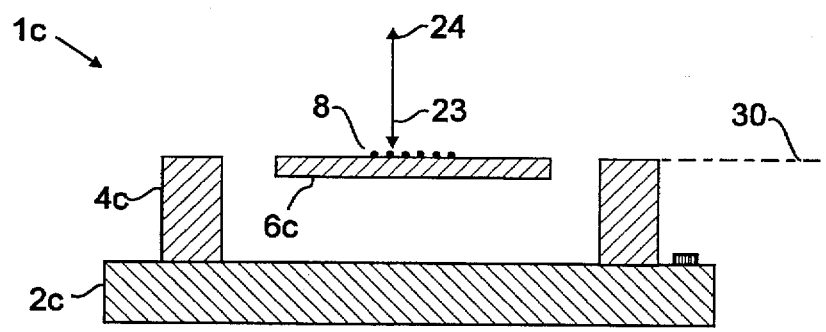
FIG. 8b shows the optical modulator/switch of FIG. 8a in the quiescent state.

Regarding operation, FIGS. 8a and 8b show the optical modulator/switch 1c in a quiescent state, wherein the reflective zone plate 8 is perpendicular to an incident optical signal 23. The reflected optical signal 24 will return along the same path as the incident optical signal 23 but in the opposite direction.

Figure 8C:
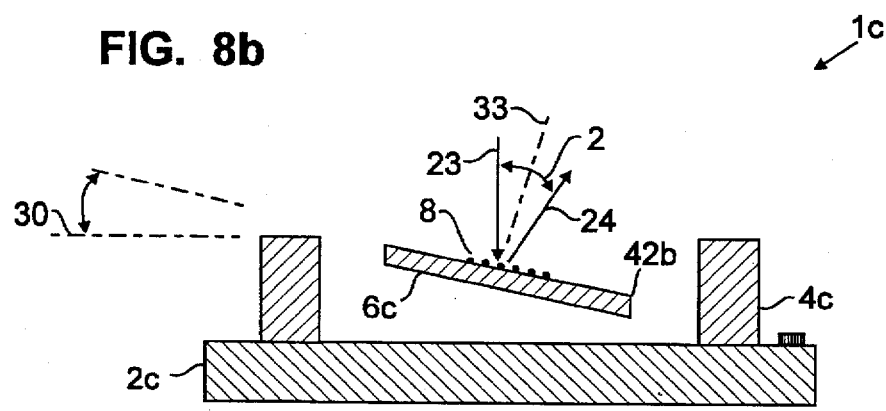
FIG. 8c shows the optical modulator/switch of FIG. 8a in the biased state.

FIG. 8c shows the optical modulatocr/switch 1c in a biased state. In response to a control signal, the controlled-voltage source 18c applies a voltage across the zone-plate support 6c and layer 2c. The applied voltage generates an electrostatic force that causes the conductive region of the zone-plate support 6c to move towards the conductive region of the layer 2c. In the torsional configuration of the optical modulator/switch 1c, the zone-plate support 6c rotates about the axis defined by the torsional members 7c and 7d so that one side of the zone-plate support is drawn towards the layer 2c. Thus, when the optical modulator/switch 1c is under bias, the reflective zone plate 8 tilts downwardly toward either the left or the right of the torsional members 7c and 7d, depending upon the location of the conductive regions. The reflective zone plate 8 will be thus be displaced by an angle, β, relative to the axis 30, from its non-biased orientation. As such, normal axis 33 will no longer be coincident with the incident optical signal 23. The reflected optical signal 24 will therefore not return to its source. The path of the reflected optical signal 24 will be displaced from the path of the incident optical signal 23 by 2β.

In the optical modulator/switch 1c, the zone-plate support 6c, torsional members 7c and 7d, and the support structure 4c provide the function and structure indicated by the support means 4 of the optical modulator/switch 1 described earlier in this specification. The controlled-voltage source 18c and torsional members 7c and 7d in conjunction with the conductive regions of the zone-plate support 6c and the layer 2c provide the function and structure indicated by the movement means 18 of the optical modulator/switch 1.

The various embodiments of an optical modulator/switch described above can be used in any of the arrangements 100a, 100b, 200a and 200b previously described. Surface and bulk micromachining techniques well-known to those skilled in the art can be used to form an optical modulator/switch according to the present invention. It will be appreciated by those skilled in the art that elements, such as the zone-plate support 6 and the conductive layer 2, which are indicated to be conductive or partially conductive, can either be intrinsically conductive, or rendered conductive by the deposition of suitably conductive materials or, as appropriate, by doping with appropriate species. Further details concerning the reflective zone plate 8 utilized in present invention are described below.

As previously described, a reflective zone plate 8 utilized in the present invention can be configured as illustrated in FIG. 2. FIG. 2 shows a reflective zone plate 8a defined by spaced, concentrically-disposed, circularly-shaped non-reflective regions 10 and circularly-shaped reflective regions 11 located therebetween. Those skilled in the art will know many ways for creating the non-reflective and reflective regions. For example, the non-reflective regions 10 can be transparent so that light passes through such regions and is absorbed by underlying layers, or they can be black. Reflective regions can be created by coating the smooth surface of a reflective zone plate 8a with a highly reflective material, such as aluminum or gold, in the appropriate regions 11. It is within the capabilities of those skilled in the art to select an appropriate method, i.e., photolithographic, print, various deposition techniques, for applying materials to the zone-plate support 6 to form the non-reflective and reflective regions. Other embodiments of non-reflective and reflective regions, and ways for forming such regions, that occur to those skilled in the art, can suitably be used.

Figure 9:
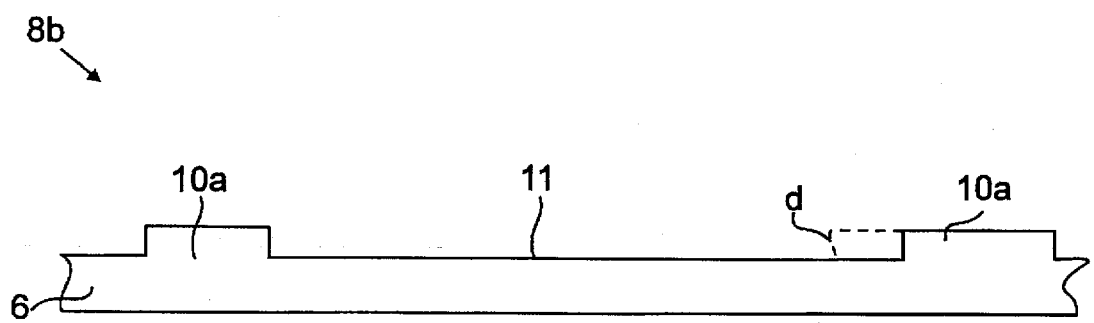
FIG. 9 illustrates a first preferred embodiment of a reflective zone plate.

For optical modulators/switches according to the invention using the reflective zone plate 8a, half of the incident optical signal is lost in the non-reflective regions 10. It will be appreciated by those skilled in the art that by increasing or decreasing the path length of the "out-of-phase" contributions to the optical signal by one-half of a wavelength, such contributions will be brought in-phase with the rest of the optical signal. In a preferred embodiment of a reflective zone plate 8b, shown in FIG. 9, the surface of the reflective zone plate where the non-reflective regions would otherwise be located should be treated, as appropriate, to be reflective, and should be one-quarter of a wavelength higher, as indicated by the reference character, d, than the surface of the reflective regions 11. The roundtrip path length for light reflecting off such regions is decreased by one-half of a wavelength. Thus, the non-reflective regions 10 become phase-reversing reflecting regions 10a. The amplitude of an optical signal reflected from the reflective zone plate 8b is twice that of an optical signal reflected from reflective zone plate 8a. Surface or bulk micromachining techniques known to those skilled in the art can be used to form the λ/4 steps in surface height.

There are typically fewer limitations on the materials choice for the various elements of a modulator/switch according to the present invention than for typical modulators. Surface treatments can be used to form the desired regions, e.g., non-reflective, reflective and phase-reversing. Suitable materials for the zone-plate support 6 include, without limitation, polysilicon, indium-tin-oxide (ITO) coated glass, silicon nitride, metal films and plastic.

Figure 10A:
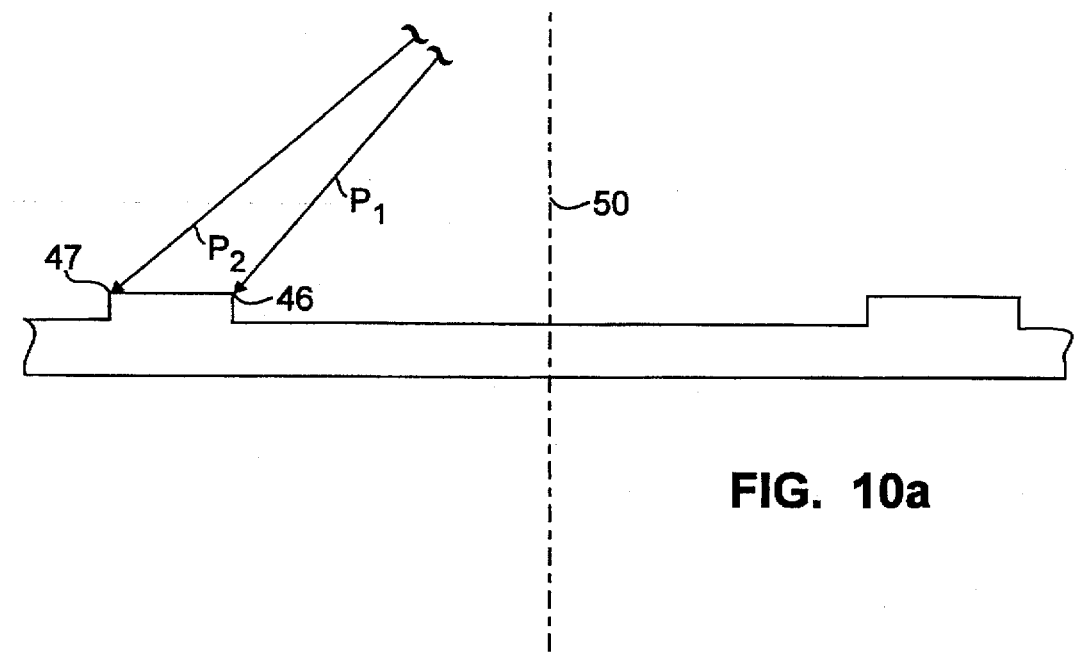
FIG. 10a demonstrates optical path length differences between sections of a given zone or region.

Referring to FIG. 10a, the path length, $P_1$, for light striking the inner edge 46 of a given zone is shorter than the path length, $P_2$, for light striking the outer edge 47 of that zone, assuming an optical source located on the axis 50 through the center of the reflective zone plate 8a or 8b. This path length difference introduces phase shifts that result in an amount of destructive interference. In a further preferred embodiment of a reflective zone plate 8c shown in FIG. 10b, the surface of each region is stepped upwardly as the radius of the region increases. While an infinite number of steps, i.e., a smooth, rising surface, would provide the best performance, fabrication would be difficult. Preferably, at least four "steps" replace each pair of two level zones, although a two-step zone plate improves performance considerably relative to a flat surface. For a four level plate, the step heights would typically repeat the sequence, 0, 1/8λ, 1/4λ, and 3/8λ. For a zone plate having a number, b, of steps or levels, the step height is λ/(2b), with the first level always being zero.

The zone radii of the reflective zone plate 8 are determined as follows. It is assumed that the source, S, of a Gaussian beam, i.e., the end of the wave guide delivering the optical signal, is a distance, $d_s$, from the reflective zone plate and that the detection point, P, i.e., the end of the wave guide receiving the reflected optical signal, is a distance, $d_p$, from the reflective zone plate. Both S and P are located on the symmetry axis of the reflective zone plate 8.

For a reflective zone plate 8 having two regions, such as the reflective zone plate 8a, including one having two steps or levels, such as the phase reversing reflective zone plate 8b, the zone radii are determined by the relation:

$$(R_m^2/2R)+r-d_p=m\lambda/2 \qquad [1]$$

where: $r=(R_m^2+d_p^2)^{0.5}$ and m=integer and where R is the radius of curvature of the phase front a distance, $d_s$, from the source S. When $d_s$ is large compared to λ, then R≈$d_s$.

The first zone then extends from the center of the reflective zone plate 8b out to $R_1$, the second zone from $R_1$ to $R_2$, and so forth. The solution to expression [1] is provided in Table 1. The zone radii, $R_m$, are expressed in terms of λ, the wavelength of the incident optical signal. Table 1 is based on the condition $d_s=d_p$. In other words, the wave guide delivering the optical signal and the wave guide receiving the reflected optical signal are the same distance from the reflective zone plate. The zone radii, $R_m$, are expressed as a function of $d_s$ and m. Thus, $R_m/\lambda$ for a particular zone, m, is given at various values of $d_s/\lambda$, e.g., 100, 200 ... 500.

About 99 percent of the energy of the optical signal is contained within a radius that is 1.5 times the radius of the optical beam at any given distance from the optical source, i.e., the end of the wave guide. Thus, zones having radii exceeding 1.5 times the beam radius will have negligible impact on the intensity of the reflected optical signal. The "starred" radius in each column locates the largest effective zone radius, i.e., the largest zone radius that is less than 1.5 times the beam radius, for that value of $d_s/\lambda$. For example, if $d_s/\lambda=100$, no more than 3 zones are required.

TABLE 1

| | Zone Radii $R_m$ for a Two-Level Reflective Zone Plate $R_m/\lambda$ | | | | |
|---|---|---|---|---|---|
| m | $d_s/\lambda=100$ | $d_s/\lambda=200$ | $d_s/\lambda=300$ | $d_s/\lambda=400$ | $d_s/\lambda=500$ |
| 1 | 7.38 | 10.11 | 12.31 | 14.18 | 15.84 |
| 2 | 10.44 | 14.31 | 17.41 | 20.06 | 22.40 |
| 3 | 12.79 | 17.53 | 21.33 | 24.57 | 27.44 |
| 4 | | 20.24 | 24.63 | 28.37 | 31.69 |
| 5 | | 22.64 | 27.54 | 31.73 | 35.43 |
| 6 | | 24.80 | 30.17 | 34.76 | 38.81 |
| 7 | | | 32.60 | 37.54 | 41.93 |
| 8 | | | 34.85 | 40.14 | 44.83 |
| 9 | | | 36.97 | 42.58 | 47.55 |
| 10 | | | | 44.89 | 50.12 |
| 11 | | | | 47.08 | 52.57 |
| 12 | | | | 49.18 | 54.91 |
| 13 | | | | 51.19 | 57.16 |
| 14 | | | | | 59.32 |
| 15 | | | | | 61.41 |
| 16 | | | | | 63.43 |

Figure 10B:
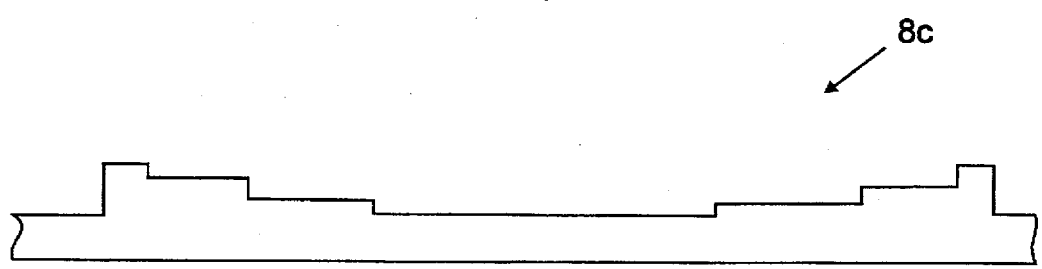
FIG. 10b shows a second preferred embodiment of a reflective zone plate.

The radii for a four-level reflective zone plate such as the reflective zone plate 8c shown in FIG. 10b are calculated as follows. The optical paths associated with neighboring zone boundaries differ by λ/4. The radii of the four-level reflective zone plate is denoted $S_{ij}$, and is given by:

$$S^2_{ij}/(2R)+r-d_p=(i-1/\lambda+(j-1)/b\lambda, \qquad [2]$$

where: i is the zone number and j is the step level, i.e., j=1,2,3,4 and b is the number of steps, e.g., 4 in the present example.

The first zone, which has no extra phase shift, extends from the center of the reflective zone plate 8c out to $S_{1,1}$. The second zone, which has a phase shift of π/2, extends from $S_{1,1}$ to $S_{1,2}$. The third zone has a phase shift of π and extends from $S_{1,2}$ to $S_{1,3}$. And the fourth zone, with a phase shift of 3π/2, extends from $S_{1,3}$ to $S_{1,4}$. The sequence then repeats with the second zone, e.g., $S_{2,1}$ to $S_{2,4}$.

The solution to expression [2], which provides the zone radii $S_{ij}$ for a four-level zone, is given in Tables 2a and 2b in terms of the optical wavelength, λ. Table 2a provides the zone radii for zones 1–5, i.e., $S_{1,1}$–$S_{5,4}$, and Table 2b provides the zone radii for zones 6–9. Tables 2a and 2b are based on the condition $d_s=d_p$. The zone radii, $S_{ij}$, are expressed as a function of $d_s$, i and j. Thus, $S_{ij}/\lambda$ for a particular zone, i, and step, j, is given at various values of $d_s/\lambda$, e.g., 100, 200 ... 500. The "starred" radius in each column locates the largest effective zone radius for that value of $d_s/\lambda$.

It should be appreciated that expression [2] can be used to calculate the zone radii for a reflective zone plate having a number, b, of steps or levels other than 4 by setting "b" in expression [2] equal to the other number of steps.

TABLE 2a

Zone Radii $S_{ij}$ for a Four-Level Reflective Zone Plate
Zones 1–5
$S_{ij}/\lambda$

| i | j | $d_s/\lambda = 100$ | $d_s/\lambda = 200$ | $d_s/\lambda = 300$ | $d_s/\lambda = 400$ | $d_s/\lambda = 500$ |
|---|---|---|---|---|---|---|
| 1 | 1 | 0 | 0 | 0 | 0 | 0 |
| 1 | 2 | 5.22 | 7.16 | 8.71 | 10.03 | 11.20 |
| 1 | 3 | 7.38 | 10.12 | 12.31 | 14.18 | 15.84 |
| 1 | 4 | 9.04 | 12.39 | 15.08 | 17.37 | 19.40 |
| 2 | 1 | 10.44 | 14.31 | 17.42 | 20.06 | 22.41 |
| 2 | 2 | 11.67 | 16.00 | 19.47 | 22.43 | 25.05 |
| 2 | 3 | 12.79 | 17.53 | 21.33 | 24.57 | 27.44 |
| 2 | 4 | 13.82 | 18.94 | 23.04 | 26.54 | 29.64 |
| 3 | 1 |  | 20.25 | 24.64 | 28.38 | 31.69 |
| 3 | 2 |  | 21.48 | 26.13 | 30.10 | 33.61 |
| 3 | 3 |  | 22.64 | 27.55 | 31.73 | 35.43 |
| 3 | 4 |  | 23.75 | 28.89 | 33.28 | 37.16 |
| 4 | 1 |  | 24.81 | 30.18 | 34.76 | 38.82 |
| 4 | 2 |  | 25.82* | 31.41 | 36.18 | 40.41 |
| 4 | 3 |  |  | 32.60 | 37.55 | 41.93 |
| 4 | 4 |  |  | 33.75 | 38.87 | 43.40 |
| 5 | 1 |  |  | 34.85 | 40.15 | 44.83 |
| 5 | 2 |  |  | 35.93 | 41.38 | 46.21 |
| 5 | 3 |  |  | 36.97 | 42.58 | 47.55 |
| 5 | 4 |  |  | 37.99 | 43.75 | 48.86 |

TABLE 2b

Zone Radii $S_{ij}$ for a Four-Level Reflective Zone Plate
Zones 6–9
$S_{ij}/\lambda$

| i | j | $d_s/\lambda = 400$ | $d_s/\lambda = 500$ |
|---|---|---|---|
| 6 | 1 | 44.89 | 50.13 |
| 6 | 2 | 46.00 | 51.37 |
| 6 | 3 | 47.09 | 52.58 |
| 6 | 4 | 48.15 | 53.76 |
| 7 | 1 | 49.18 | 54.92 |
| 7 | 2 | 50.20 | 56.05 |
| 7 | 3 | 51.20 | 57.17 |
| 7 | 4 |  | 58.26 |
| 8 | 1 |  | 59.33 |
| 8 | 2 |  | 60.38 |
| 8 | 3 |  | 61.41 |
| 8 | 4 |  | 62.43 |
| 9 | 1 |  | 63.43 |
| 9 | 2 |  |  |
| 9 | 3 |  |  |
| 9 | 4 |  |  |

Figure 11:
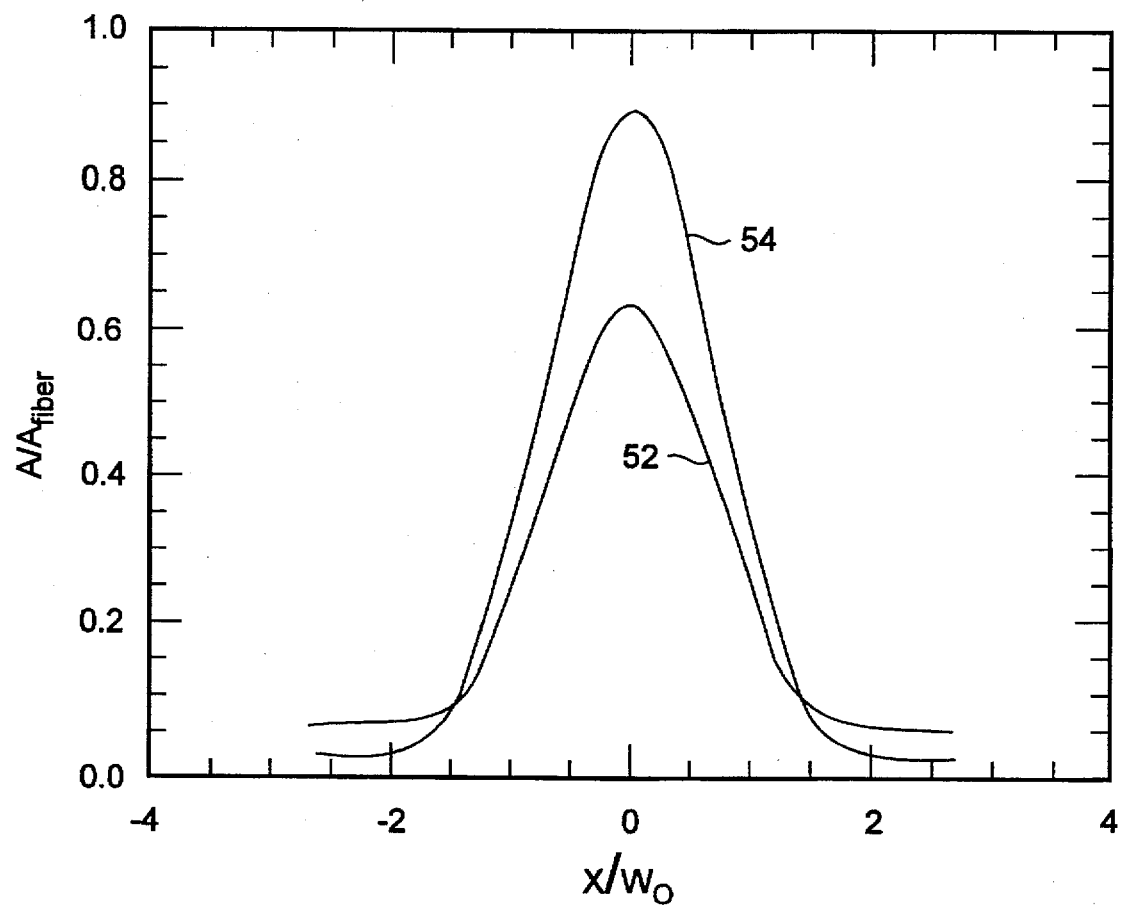
FIG. 11 shows the relative amplitude of a reflected signal for a four-level reflective zone plate and a two-level reflective zone plate as a function of the relative radial distance from center of the optical signal.

FIG. 11 shows the calculated Gaussian profile of a four-level reflective zone plate, identified by the reference numeral 54, and the profile of a two-level reflective zone plate, identified by the reference numeral 52. The profile shows the relative amplitude, 52 and 54, of the reflected signal as a function of the relative radial distance from center of the optical signal. The relative amplitude is defined as the amplitude of the reflected signal at the detector (point P), i.e., at the end of the receiving wave guide, divided by the amplitude of the incident optical signal at the source (point S), i.e., at the end of the delivering wave guide. The relative radial distance is defined as the lateral distance from the center of the optical signal at point P, divided by the radius of the optical signal at point S. FIG. 11 is based on the condition $d_p=d_s$ and $d_p/\lambda=200$. FIG. 11 shows that, on center, the optical signal reflected from a two-level reflective zone plate has an amplitude that is about 60 percent of the initial amplitude, for a signal loss of about 4 dB. The signal reflected from the four-level reflective zone plate has an amplitude that is about 90 percent of the initial amplitude, for a signal loss of about 1 dB.

Figure 12A:
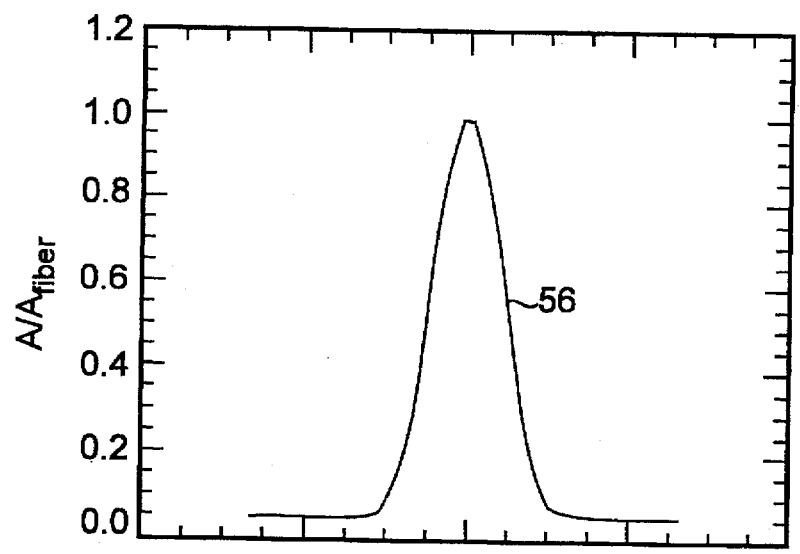
FIGS. 12a–12c show the relative amplitude of a reflected optical signal as a function of the relative radial distance for $d_s/\lambda=320$, 250 and 200, respectively.
Figure 12B:
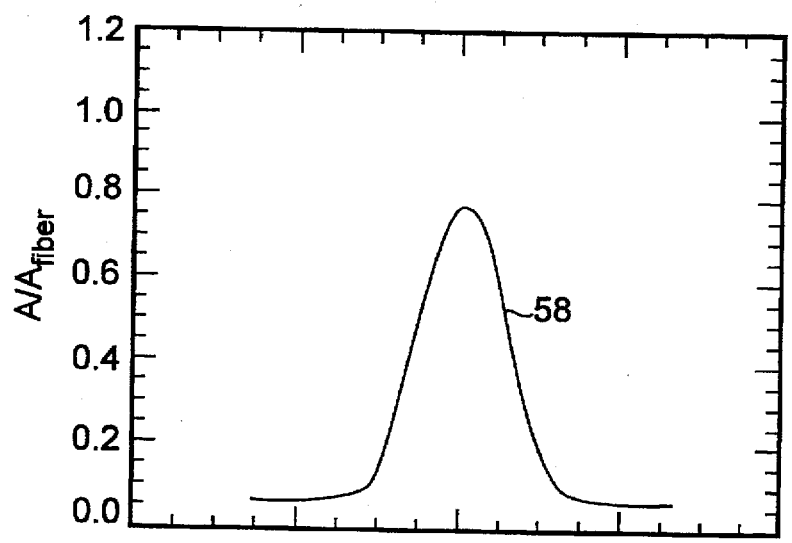
Figure 12C:
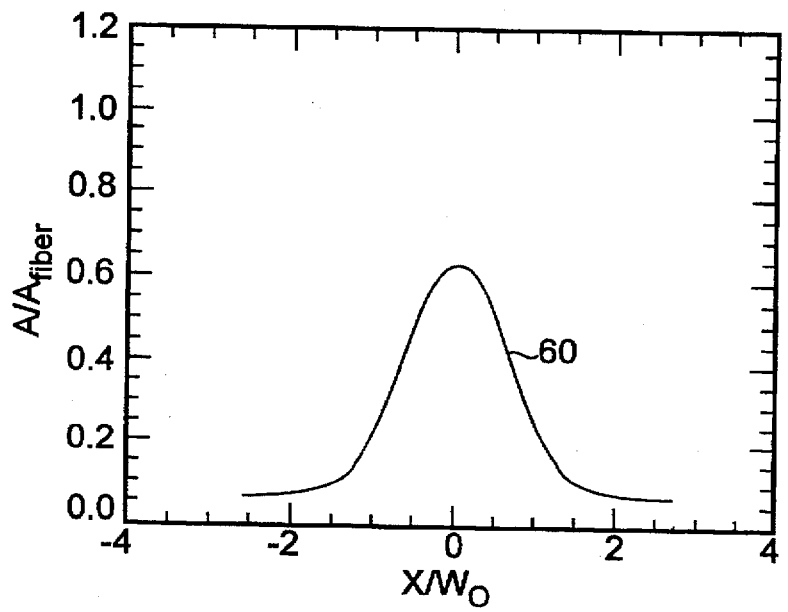

The optical signal reflected from the reflective zone plate 8 must be captured by the aperture of a wave guide, typically an optical fiber. As such, it is important that the reflected signal has an appropriate beam width, i.e., spot size, at the end of the receiving fiber. Spot size can be adjusted by varying the distance between the source, i.e., the end of the fiber delivering the optical signal, and the reflective zone plate 8. FIGS. 12a–12c show the relative amplitude of the reflected optical signal as a function of the relative radial distance, $\rho/w_o$, for several values of $d_s/\lambda$. For FIGS. 12a–12c, the relative radial distance $\rho/w_o$ is defined as the radial distance from the center of the receiving fiber divided by the width of the optical signal at the end of the delivering fiber. For FIGS. 12a–12c, $d_p/\lambda=200$. The relative amplitude 56, 58 and 60 of the reflected signal for $d_s/\lambda=320$, $d_s/\lambda=250$ and $d_s/\lambda=200$, respectively, is shown in FIGS. 12a, 12b and 12c, respectively. FIGS. 12a–12c show that as the distance between the source fiber and the reflective zone plate 8 increases, the profile narrows. As such, a greater portion of the energy is captured within a smaller radius at greater source to plate distances. Thus, the spacing between the end of the source wave guide and the reflective zone plate can be adjusted for the aperature of the receiving wave guide.

In arrangements such as 100b, 200a, 200b, the reflected optical beam must be directed toward one or more wave guides. Thus, for a particular spacing between the wave guide and the reflective zone plate 8, the reflective zone plate 8 must be tilted to a particular angle, $\beta$. The tilt of the reflective zone plate 8 corresponds to a particular deflection of the zone-plate support 6. The amount that the zone-plate support deflects is controlled by the applied voltage, V.

The voltage, V, required for a particular deflection of the zone-plate support can be determined by routine experimentation. Alternatively, the voltage, V, calculated according to the following methods.

Figure 13:
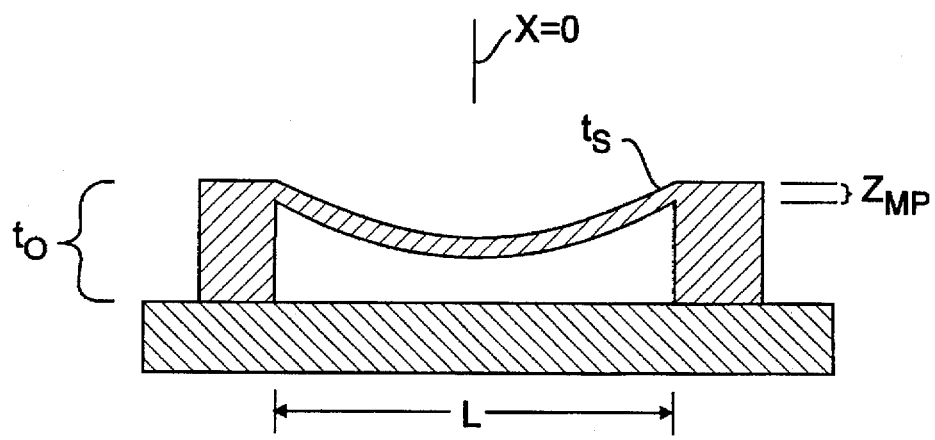
FIG. 13 is an illustration of a doubly-suspended beam.

The voltage, V, required for a particular amount of deflection of the zone-plate support 6a having a doubly supported beam configuration can be determined as follows, referring to FIGS. 13 and 14. When the tension in the zone-plate support 6a is large, the force equation is given by:

$$T(d^2Z/dx^2)=0.5\epsilon_o w \, V^2/(t_o+t_s/K_s+Z)^2 \qquad [3]$$

where: T=tension, $\epsilon_o$=permittivity, w=width of the zone-plate support, V=voltage, $t_o$=the unbiased gap between the zone-plate support 6a and the conductive layer 2, $t_s$=zone-plate support thickness, $K_s$=relative dielectric constant, Z is the beam displacement and x is the lateral position along the length of the zone-plate support 6a measured from the midpoint.

The solution of the above expression gives Z as a function of x and V and can be approximated by the expression:

$$Z(x,V)=Z_{mp}(V)\cos(\pi x/L) \qquad [4]$$

In expression [4], $Z_{mp}$ is the displacement of the zone-plate support 6a at the midpoint and L is the length of the zone-plate support 6a. The relative displacement $Z_{mp}/t_{eff}$ is a universal function of U, where $t_{eff}=t_o+t_s/K_s$, $U=\epsilon_o V^2/$ $(\rho t_s t_{eff}^3 f_{res}^2)$, $f_{res}=1/(2L)(S/\rho)^{0.5}$ and S=the stress of the material forming the zone-plate support 6a.

Figure 14:
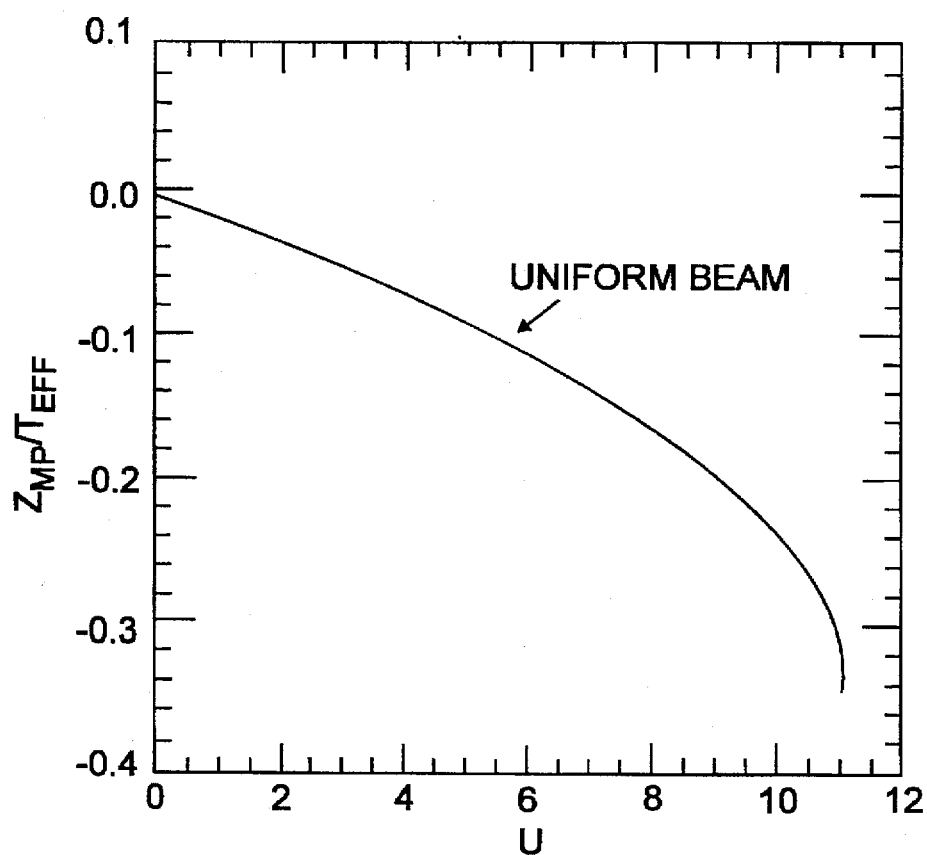
FIG. 14 shows the universal curve $Z_{mp}/t_{eff}$ as a function of U, which is useful for determining drive voltage requirements for a given membrane displacement.

FIG. 14 shows the universal curve $Z_{mp}/t_{eff}$ as a function of U. The plot shows that the displacement increases with V (or U) until it becomes unstable at $U=U_c \approx 11.2$.

For given spacings between the reflective zone plate 8a and two wave guides, and a given distance between the two wave guides, the tilt angle, β, of the zone plate 8a can be determined by geometry. Knowing the tilt angle and the length of the zone-plate support 6a, the required relative displacement, $Z_{mp}/t_{eff}$, of the zone plate support 6a can be determined. The corresponding value of U can be read from FIG. 14. This value of U and expression [5] can then be used to determine the voltage, V, to achieve the desired tilt angle β.

For a zone-plate support 6b having a cantilever arrangement, the force expression is given by:

$$EI(d^4Z/dx^4)=0.5\epsilon_o w\, V^2/(t_o+t_s/K_s+Z)^2$$

where: E is Young's modulus and I is the moment of inertia and the other variables are as previously defined. The tilt angle and voltage requirements can be determined in a manner similar to that described for the doubly-supported beam configuration.

Although a number of specific embodiments of this invention have been shown and described herein, it is to be understood that these embodiments are merely illustrative of the many possible specific arrangments which can be devised in application of the principles of this invention. Numerous and varied other arrangements can be devised in accordance with these principles by those of ordinary skill in the art without departing from the scope and spirit of the invention.

I claim:

1. An optical modulator/switch comprising:

a reflective zone plate for receiving an incident optical signal and returning a reflected optical signal that is focused at a location a predetermined distance from the reflective zone plate, the reflective zone plate having a first and a second state and defined by (i) a central circular region enclosed by a first plurality of spaced, concentrically-disposed annular-shaped regions, both the circular and annular regions being of a first type and (ii) a second plurality of regions of a second type located between the spaced annular-shaped regions of the first type, the reflective zone plate having one of either a first or a second configuration;

a zone-plate support, in which or on which the reflective zone plate is defined, the zone-plate support physically configured so that it moves in response to a force, changing state from or to the first state, to or from the second state;

a conductive layer spaced from the zone-plate support; and a controlled voltage source electrically connected to the zone-plate support and the layer; wherein, in the first configuration, regions of the first type prevent negative contributions to the amplitude of the reflected optical signal from reaching the focal location and regions of the second type reflect positive contributions to the amplitude of the reflected optical signal to the focal location, and, in the second configuration, regions of the first type reflect positive contributions to the amplitude of the reflected signal to the focal location and regions of the second type prevent negative contributions to the amplitude of the reflected signal from reaching the focal location.

2. The optical modulator/switch of claim 1 wherein, in the first orientation, the reflective zone plate is perpendicular to the the incident optical signal.

3. The optical modulator/switch of claim 1 further comprising a first waveguide, wherein, the first waveguide delivers the incident signal to the reflective zone plate and, in the first state, the first waveguide is in optical communication with the reflected signal, and, in the second state, the first waveguide is not in optical communication with the reflected signal.

4. The optical modulator/switch of claim 1 further comprising a first and a second waveguide, wherein, the first waveguide delivers the incident optical signal to the reflective zone plate and, in the first state, the second waveguide is in optical communication with the reflected optical signal, and, in the second state, the second waveguide is not in optical communication with the reflected optical signal.

5. The optical modulator/switch of claim 1 further comprising a first, a second and a third waveguide, wherein, the first waveguide delivers the incident signal to the reflective zone plate, and, in the first state, the second waveguide is in optical communication with the reflected signal, and, in the second state, the third waveguide is in optical communication with the reflected signal.

6. The optical modulator/switch of claim 1 wherein the distance between the reflective zone plate and the focal location is in the range from about 100 to about 500 times the wavelength of the incident optical signal.

7. The optical modulator/switch of claim 1 wherein the regions that prevent negative contributions to the amplitude of the reflected signal from reaching the focal location do not reflect negative contributions.

8. The optical modulator/switch of claim 1 wherein the regions that prevent negative contributions to the amplitude of the reflected signal from reaching the focal location change the phase of the reflected optical signal by about 180°.

9. The optical modulator/switch of claim 1 further comprising a waveguide having a first end positioned at the focal location.

10. The optical modulator/switch of claim 1 wherein the zone-plate support is flexible and has a doubly-supported beam configuration.

11. The optical modulator/switch of claim 10 further comprising a waveguide having a first end positioned at the focal location.

12. The optical modulator/switch of claim 1 wherein the zone-plate support has a cantilever configuration.

13. The optical modulator/switch of claim 12 further comprising a waveguide having a first end positioned at the focal location.

14. The optical modulator/switch of claim 1 wherein the zone-plate support has a torsional configuration.

15. The optical modulator/switch of claim 14 further comprising a waveguide having a first end positioned at the focal location.

16. The optical modulator/switch of claim 1 wherein each region of the first and second plurality of regions are further comprised of sections, each section within a region differing in height from an adjacent section in the region by the same amount.

17. A method for modulating an optical signal, comprising the steps of:

generating an electrostatic force according to a control signal, the electrostatic force causing a reflective zone plate to change between a first and a second orientation relative to the optical signal; and reflecting the optical signal off of the reflective zone plate, wherein, the change in orientation of the reflective zone plate causes a change in a path of the optical signal reflected from the reflective zone plate so that in the first orientation, the optical signal is reflected to a predetermined location, and, in the second orientation, the optical signal is not reflected to the predetermined location, the controlled change in optical path resulting in modulation of the optical signal.

18. A method for switching an optical signal, comprising the steps of:

generating an electrostatic force in response to a control signal causing a reflective zone plate to move between a first first orientation and a second orientation relative to the optical signal; and reflecting the optical signal off of the reflective zone plate to a first waveguide when the reflective zone plate is in the first orientation and to a second waveguide when the reflective zone plate is in the second orientation.

19. The method of claim 18 and further wherein the step of moving results in a third orientation of the reflective zone plate and the step of reflecting further comprises reflecting the optical signal off the reflective zone plate to a third waveguide when the reflective zone plate is in the third orientation.

* * * * *